United States Patent
Madle et al.

(10) Patent No.: US 9,963,557 B2
(45) Date of Patent: May 8, 2018

(54) LOW-VOC, LOW COST COALESCENT FOR CERTAIN AQUEOUS POLYMERIC DISPERSIONS

(71) Applicants: Rohm and Haas Company, Philadelphia, PA (US); Dow Global Technologies LLC, Midland, MI (US)

(72) Inventors: Thomas Glenn Madle, Flourtown, PA (US); Sudhakar Balijepalli, Midland, MI (US); Alvin M. Maurice, Lansdale, PA (US); Felipe A. Donate, Midland, MI (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 74 days.

(21) Appl. No.: 15/149,511

(22) Filed: May 9, 2016

(65) Prior Publication Data

US 2016/0347912 A1    Dec. 1, 2016

Related U.S. Application Data

(60) Provisional application No. 62/166,866, filed on May 27, 2015.

(51) Int. Cl.
| | |
|---|---|
| *C08C 1/08* | (2006.01) |
| *C08J 3/03* | (2006.01) |
| *C09D 5/02* | (2006.01) |
| *C09D 131/04* | (2006.01) |

(52) U.S. Cl.
CPC ............ *C08J 3/03* (2013.01); *C09D 5/02* (2013.01); *C09D 5/024* (2013.01); *C09D 5/028* (2013.01); *C09D 7/63* (2018.01); *C09D 131/04* (2013.01); *C08J 2331/04* (2013.01)

(58) Field of Classification Search
CPC .............. C08J 3/03; C09D 5/02; C09D 5/024
See application file for complete search history.

(56) References Cited

U.S. PATENT DOCUMENTS

| | | |
|---|---|---|
| 4,384,056 A | 5/1983 | Schmidt et al. |
| 4,530,954 A | 7/1985 | Arpin |
| 4,539,361 A | 9/1985 | Siol et al. |
| 5,186,744 A | 2/1993 | Bodwell et al. |
| 5,229,437 A | 7/1993 | Knight |
| 8,558,029 B2* | 10/2013 | Tirtowidjojo ........... C07C 41/03 568/648 |
| 2002/0065361 A1 | 5/2002 | Tanimoto et al. |
| 2005/0143505 A1* | 6/2005 | Rosekelly ............ C08K 5/0041 524/236 |
| 2011/0318494 A1 | 12/2011 | Donate et al. |

* cited by examiner

*Primary Examiner* — Hannah J Pak
(74) *Attorney, Agent, or Firm* — Karl E. Stauss; Ronald D. Bakule

(57) ABSTRACT

A coalescent consisting essentially of a residue from a process for forming propyleneglycol phenyl ether, the coalescent consisting essentially of 65%-75% by weight, based on the weight of the residue, dipropyleneglycol phenyl ether, 8%-10% by weight, based on the weight of the coalescent, monopropyleneglycol phenyl ether, 4%-6% by weight, based on the weight of the coalescent, tripropyleneglycol phenyl ether, and 0.1%-10% by weight, based on the weight of the coalescent, alkalinity (reported as NaOH) is provided. Also provided is a method for forming certain low-VOC, low cost, coalesced aqueous polymeric dispersions including, as copolymerized units, from 70% to 100% by weight, based on the solids weight of the aqueous polymeric dispersion, vinyl acetate monomer and an aqueous coating composition including the coalesced aqueous polymeric dispersion.

9 Claims, No Drawings

LOW-VOC, LOW COST COALESCENT FOR CERTAIN AQUEOUS POLYMERIC DISPERSIONS

This invention relates to a coalescent composition consisting essentially of a residue from a process for forming propyleneglycol phenyl ether, the coalescent consisting essentially of 65%-75% by weight, based on the weight of the residue, dipropyleneglycol phenyl ether, 8%-10% by weight, based on the weight of the coalescent, monopropyleneglycol phenyl ether, 4%-6% by weight, based on the weight of the coalescent, tripropyleneglycol phenyl ether, and 0.1%-10% by weight, based on the weight of the coalescent, alkalinity (reported as NaOH). The invention also relates to a method for forming certain low-VOC, low cost, coalesced aqueous polymeric dispersions. In particular, the method includes providing the coalescent of the present invention; and contacting an aqueous polymeric dispersion including, as copolymerized units, from 70% to 100% by weight, based on the solids weight of the aqueous polymeric dispersion, vinyl acetate monomer, with from 0.5% to 20% by weight, based on the aqueous polymeric dispersion solids weight, of the coalescent. The invention also relates to an aqueous coating composition including the coalesced aqueous polymeric dispersion.

Volatile organic compound (VOC) emissions contribute to the creation of ozone, a main constituent of smog. In the US, VOC regulations established by the US Environmental Protection Agency (EPA) and enforced at the state level dictate the maximum concentration of volatile solvents in paints, clean up solvents, and other products. In Europe, VOC limits are defined by the 2004/42/EC Solvents Directive for Decorative Paints. VOC regulations have become more and more stringent and have affected the use of available surfactants.

The present invention serves to provide low-VOC, inherently low cost coalescent compositions effective in coalescing certain aqueous polymeric dispersions, in particular those aqueous polymeric dispersions relatively high in copolymerized vinyl acetate content in numerous compositions, as well as slowing their hydrolysis rate, particularly for use in applications that include, for example, aqueous decorative and protective coatings for various substrates.

US Patent Application Publication No. 2011/0318494 A1 discloses a coalescent composition including from 20% to 80% by weight, based on the weight of the coalescent composition, alkylene glycol phenyl ether and from 80% to 20% by weight, based on the weight of the coalescent composition, dialkylene glycol phenyl ether, wherein the alkylene is selected from the group consisting of ethylene and propylene and the dialkylene is diethylene when the alkylene is ethylene and the dialkylene is dipropylene when the alkylene is propylene. Also disclosed is an aqueous coating composition including an aqueous polymeric dispersion and from 0.1% to 40% by weight, based on the weight of aqueous polymeric dispersion solids, of the coalescent composition and a method for providing a dry coating. Lower cost coalescents, particularly those effective in high vinyl acetate compositions are still sought.

In a first aspect of the present invention there is provided a coalescent consisting essentially of a residue from a process for forming propyleneglycol phenyl ether, said coalescent consisting essentially of 65%-75% by weight, based on the weight of the residue, dipropyleneglycol phenyl ether, 8%-10% by weight, based on the weight of the coalescent, monopropyleneglycol phenyl ether, 4%-6% by weight, based on the weight of the coalescent, tripropyleneglycol phenyl ether, and 0.1%-10% by weight, based on the weight of the coalescent, alkalinity (reported as NaOH).

In a second aspect of the present invention there is provided a method for forming a low VOC, low cost, coalesced aqueous polymeric dispersion comprising: a) providing a coalescent consisting essentially of a residue from a process for forming propyleneglycol phenyl ether, said coalescent consisting essentially of 65%-75% by weight, based on the weight of the coalescent, dipropyleneglycol phenyl ether, 8%-10% by weight, based on the weight of the coalescent, monopropyleneglycol phenyl ether, 4%-6% by weight, based on the weight of the coalescent, tripropyleneglycol phenyl ether, and 0.1%-10% by weight, based on the weight of the coalescent, alkalinity (reported as NaOH); and b) contacting an aqueous polymeric dispersion comprising, as copolymerized units, from 70% to 100%, by weight based on the solids weight of said aqueous polymeric dispersion, vinyl acetate monomer, with from 0.5% to 20% by weight, based on said aqueous polymeric dispersion solids weight, said coalescent.

In a third aspect of the present invention there is provided an aqueous coating composition comprising: a) an aqueous polymeric dispersion comprising, as copolymerized units, from 70% to 100%, by weight based on said aqueous polymeric dispersion solids weight, vinyl acetate monomer; and b) from 0.5% to 20% by weight, based on said aqueous polymeric dispersion solids weight, of a coalescent consisting essentially of a residue from a process for forming propyleneglycol phenyl ether, said coalescent consisting essentially of 65%-75% by weight, based on the weight of the coalescent, dipropyleneglycol phenyl ether, 8-10% by weight, based on the weight of the coalescent, monopropyleneglycol phenyl ether, 4%-6% by weight, based on the weight of the coalescent, tripropyleneglycol phenyl ether, and 0.1%-10% by weight, based on the weight of the coalescent, alkalinity (reported as NaOH).

The present invention relates to a coalescent consisting essentially of a residue from a process for forming propyleneglycol phenyl ether, the coalescent consisting essentially of 65%-75% by weight, based on the weight of the residue, dipropyleneglycol phenyl ether, 8%-10% by weight, based on the weight of the coalescent, monopropyleneglycol phenyl ether, 4%-6% by weight, based on the weight of the coalescent, tripropyleneglycol phenyl ether, and 0.1%-10%, preferably from 0.1%-5%, by weight, based on the weight of the coalescent, alkalinity (reported as NaOH). The process for forming propyleneglycol phenyl ether referred to herein is typically a process including reacting propylene oxide, and phenol using a catalytic amount of a base catalyst such as NaOH, as is disclosed in U.S. Pat. No. 8,558,029 B2, included by reference herein. Particularly disclosed therein is the coalescent residue or "bottom stream" from a particular set of conditions at column 9, lines 11-21. One skilled in the art would recognize that the precise amounts of the residue components may vary as equipment and conditions vary. The key aspects of the residue that functions as a coalescent in the present invention are: 1) its low-VOC capabilities; 2) its low cost; 3) its efficacy as a coalescent for certain aqueous polymeric dispersions; and 4) its efficacy in ameliorating the hydrolysis of the certain polymer in those aqueous polymeric dispersions. The low-VOC capability of a coalescent is to a degree conjugate with its efficacy as a coalescent, as well as dependent on its volatility. The low cost aspect of the present residue resides in the fact, independent of the passage of time and independent of raw materials costs of the individual components for the precursor reaction, that it is, prior to the present invention, a waste product residue otherwise having only a marginal value such as, for example, in an incineration process. The recognition of the ability to utilize this waste stream as a coalescent for certain polymeric dispersions with the other advantages conferred by that use underlies the present invention.

In the process for forming propyleneglycol phenyl ether the desired propyleneglycol phenyl ether product is removed by distillation, leaving the coalescent of the present invention. The residue in the present invention is suited for use as a coalescent that consists essentially of 65%-75% by weight, based on the weight of the coalescent, dipropyleneglycol phenyl ether, 8%-10% by weight, based on the weight of the coalescent, monopropyleneglycol phenyl ether, 4%-6% by weight, based on the weight of the coalescent, tripropyleneglycol phenyl ether, and 0.1%-10%, preferably from 0.1%-5%, by weight, based on the weight of the coalescent, alkalinity (reported as NaOH). Typically, the residue also includes other minor components.

"Alkalinity" herein is reported as the weight of NaOH equivalent in effect to the sum of species titrated in the test method presented herein. There is no intention to represent that NaOH is present as such in the coalescent as a sole or partial component. Without limitation the alkalinity herein is believed to be related, at least in part, to compositions R—O—Na$^+$ where R is defined by the alkoxylates of PPH mono-, di-, tri-phenol alkoxylates, and/or mono-, di-, tri-alkoxylates. Without being limited by a particular theory it is believed that such compositions specifically engender alkalinity and a buffering nature to the coalescent.

It is contemplated, although outside the scope of the present invention, that the reside may be further stripped, at an added processing cost, to provide, for example, a product typically including about 80% dipropyleneglycol phenyl ether, about 10% tripropyleneglycol phenyl ether, and about 10% monopropyleneglycol phenyl ether, and from 0% to 3% alkalinity (reported as sodium hydroxide); all by weight, based on the weight of the residue. Of course intermediate or more extensive degrees of processing may be effected as desired.

The present invention also relates to a method for forming a low-VOC, low cost, coalesced aqueous polymeric dispersion. In particular, the method includes providing the coalescent of the present invention and then an aqueous polymeric dispersion including, as copolymerized units, from 70% to 100%, alternatively from 90% to 100%, by weight based on the solids weight of the aqueous polymeric dispersion, vinyl acetate monomer, is contacted with from 0.5% to 20%, preferably from 1% to 10%, by weight, based on the aqueous polymeric dispersion solids weight, the coalescent composition including 65%-75% by weight, based on the weight of the coalescent, dipropyleneglycol phenyl ether, 8%-10% by weight, based on the weight of the coalescent, monopropyleneglycol phenyl ether, 4%-6% by weight, based on the weight of the coalescent, tripropyleneglycol phenyl ether, and 0.1%-10% by weight, based on the weight of the coalescent, alkalinity (reported as NaOH). The aqueous polymeric dispersion including, as copolymerized units, from 70% to 100%, alternatively from 90% to 100%, by weight based on the solids weight of the aqueous polymeric dispersion, vinyl acetate monomer includes one or more additional copolymerized monoethylenically unsaturated monomers including, for example, vinyl propionate, vinyl laurate, vinyl stearate, vinyl versatate, vinyl toluene, $C_1$-$C_{20}$ alkyl esters of maleic or fumaric acids, $C_1$-$C_{20}$ esters of acrylic, methacrylic, or itaconic acids, and vinyl chloride. The aqueous polymeric dispersion may also include copolymerized acid monomers, such as from 0% to 5%, by weight based on the polymeric dispersion solids weight, carboxylic acid monomers such as, for example, (meth) acrylic acid, crotonic acid, itaconic acid, fumaric acid, maleic acid, monomethyl itaconate, monomethyl fumarate, monobutyl fumarate, maleic anhydride; 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth) acrylate, phosphopropyl (meth)acrylate, and phosphobutyl (meth)acrylate, phosphoalkyl crotonates, phosphoalkyl maleates, phosphoalkyl fumarates, phosphodialkyl (meth) acrylates, phosphodialkyl crotonates, and allyl phosphate, and the like. The aqueous polymeric dispersion may also include from 0% to 6%, or in the alternative, from 0% to 3 wt % or from 0% to 1%, by weight based on the weight of the polymer, of a copolymerized multi-ethylenically unsaturated monomer. It is important to select the level of multi-ethylenically unsaturated monomer so as to not materially interfere with film formation and integrity. Multi-ethylenically unsaturated monomers include, for example, allyl acrylate, diallyl phthalate, 1,4-butylene glycol diacrylate, 1,2-ethylene glycol diacrylate, 1,6-hexanediol diacrylate, and divinyl benzene.

The minimum film formation temperature ("MFFT" herein) of the aqueous polymeric dispersion absent any coalescent is from 0° C. to 45° C., alternatively from 0° C. to 25° C. MFFTs of the aqueous polymeric dispersion herein are those measured using a Coesfeld Thermostair MFFT bar (Coesfeld GMBH).

It is further contemplated that a coalescent other than the coalescent of the present invention (a "second coalescent" herein) may be employed in this method by adding the second coalescent before during or after the time period when the aqueous polymeric dispersion is contacted with the coalescent of the present invention.

The aqueous polymeric dispersion that has been contacted with the residue is defined herein as a "coalesced aqueous polymeric dispersion" herein when the MFFT of the aqueous polymeric dispersion has been lowered by at least 1° C. As is well-known in the art, it may be necessary to allow some time after contacting the aqueous polymeric dispersion for the overall composition, and hence, the MFFT, to attain an equilibrium state. Typically, from 1 to 4 hours at 25° C. may be allowed for equilibrium to be attained.

The aqueous polymeric dispersion may be a dispersion of a polymer, oligomer, or prepolymer in an aqueous medium. In some embodiments the aqueous polymeric dispersion may be reactive before, during, or subsequent to film formation. By "aqueous" herein is meant herein a continuous phase in which the polymer is dispersed including at least 75%, by weight based on the weight of the medium, water.

The aqueous polymeric dispersion is typically formed by an addition-polymerization, emulsion polymerization process as is known in the art. Conventional surfactants and blends may be used including, for example, anionic and/or nonionic emulsifiers such as, for example, alkali metal or ammonium alkyl sulfates, alkyl sulfonic acids, fatty acids, and oxyethylated alkyl phenols, and mixtures thereof. Polymerizable surfactants that include at least one ethylenically unsaturated carbon-carbon bond which can undergo free radical addition polymerization may be used. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymer. The monomer mixture may be added neat or as an emulsion in water. The monomer mixture may be added in a single addition or more additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to the monomer addition. Processes yielding polymodal particle size distributions such as those disclosed in U.S. Pat. Nos. 4,384,056 and 4,539,361, for example, may be employed. The emulsion polymer may be formed in a multi-stage emulsion polymerization process as are well known in the art. In certain embodiments the emulsion polymer is contemplated to be formed in two or more stages, the stages differing in molecular weight. Blending of two different emulsion polymers is also contemplated.

The average particle diameter of the emulsion polymer particles is typically from 40 nm to 1000 nm, preferably from 40 nm to 350 nm. Particle diameters herein are those measured by dynamic light scattering on a Brookhaven BI-90 Plus particle size analyzer.

The low-VOC, low cost, coalesced aqueous polymeric dispersion of the invention is prepared by techniques that are well known in the coatings art. The coalescent of the invention can be added to the dispersion at multiple points during the polymeric dispersion synthesis and formulation process. This includes before emulsion polymerization, during emulsion polymerization, after emulsion polymerization, to the grind, during the coating formulation, or to the fully formulated coating composition.

Forming the aqueous coating composition of the present invention typically; first, pigment(s), if any, are well dispersed in an aqueous medium under high shear such as is afforded by a COWLES™ mixer or predispersed colorant(s), or mixtures thereof are used. Then, typically, the aqueous polymeric dispersion polymer is added under low shear stirring along with the coalescent composition of the invention and other coatings adjuvants as desired. The aqueous coating composition may include, in addition, conventional coatings adjuvants such as, for example, extenders, emulsifiers, coalescing agents other than the coalescent composition of the present invention, plasticizers, antifreezes, curing agents, buffers, neutralizers, thickeners, rheology modifiers, humectants, wetting agents, biocides, antifoaming agents, UV absorbers, fluorescent brighteners, light or heat stabilizers, biocides, chelating agents, dispersants, colorants, waxes, and water-repellants.

Examples of suitable pigments and extenders include titanium dioxide such as anatase and rutile titanium dioxides; zinc oxide; antimony oxide; iron oxide; magnesium silicate; calcium carbonate; organic and inorganic colored pigments; aluminosilcates; silica; various clays such as kaolin and delaminated clay; and lead oxide. It is also contemplated that the aqueous coating composition may also contain opaque polymer particles, such as, for example, Ropaque™ Opaque Polymers (The Dow Chemical Co.).

The amounts of pigment and extender in the aqueous coating composition may vary from a pigment volume concentration (PVC) of 0 to 85 and thereby encompass coatings otherwise described in the art, for example, as clear coatings, stains, flat coatings, satin coatings, semi-gloss coatings, gloss coatings, primers, textured coatings, and the like. The aqueous coating composition herein expressly includes architectural, maintenance, and industrial coatings, caulks, sealants, and adhesives. The pigment volume concentration is calculated by the following formula:

$$PVC(\%) = \frac{\text{volume of pigment(s)}, + \text{volume extender(s)} \times 100.}{\text{total dry volume of paint}}$$

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably.

The aqueous coating composition is typically applied to a substrate such as, for example, wood, metal, plastics, marine and civil engineering substrates, cementitious substrates such as, for example, concrete, stucco, and mortar, previously painted or primed surfaces, and weathered surfaces. The aqueous coating composition may be applied to a substrate using conventional coatings application methods such as, for example, brush, roller, caulking applicator, roll coating, gravure roll, curtain coater and spraying methods such as, for example, air-atomized spray, air-assisted spray, airless spray, high volume low pressure spray, and air-assisted airless spray.

Drying of the aqueous coating composition to provide a coating may be allowed to proceed under ambient conditions such as, for example, at 5° C. to 35° C. or the coating may be dried at elevated temperatures such as, for example, from 35° C. to 150° C.

The invention in some of its embodiments will now be further described by reference to the following examples:

Monomer abbreviations used herein.

VA=vinyl acetate
VV=vinyl versatate
BA=butyl acrylate
AMPS=2-acrylamido-2-methylpropane sulfonic acid
IA=itaconic acid

EXPERIMENTAL METHODS

Determination of Percent VOC in Solvents by ASTM D2369

The volatiles content of coalescent were obtained by ASTM D2369. Determinations were conducted in triplicate using aluminum weigh boats that had been previously labeled with an engraver. An empty weigh boat was placed on an analytical balance and the weight recorded. The weigh boat was then tared and 0.5000 g of the test coalescent was added in a circular motion. This procedure was repeated with the other two weigh boats. The loaded weigh boats were placed in a 110° C. oven for 1 hour as per the ASTM method. The weigh boats were then removed from the oven using metal tweezers and placed in a desiccator to cool. Once cooled, the boats were reweighed on the analytical balance. Percent volatiles were calculated using the equation that follows:

Percent Volatiles =

$$100 \times \frac{[\text{Coalescent wt.} - (\text{wt. of boat after 1 hour} - \text{wt. empty boat}]}{\text{Coalescent wt. (g)}}$$

Determination of Alkalinity of Coalescent

A sample of the coalescent was dissolved in methanol and titrated with 0.5000 N hydrochloric acid in methanol to the potentiometric inflection point using a Mettler T70 Autotitrator equipped with one internal 10 mL burette: (available from Mettler-Toledo, Inc.), a 100 cc. polypropylene titration beaker and a Ross Orion Sure Flow Electrode—Part No. 8172BN (available from Thermo Fisher Scientific, 81 Wyman Street, Waltham, Mass. 02454 USA). One mole of acid neutralizes one mole of alkalinity, reported as sodium hydroxide.

All samples of the coalescent of the invention used in the examples contained (all values are by weight, based on the weight of the coalescent) 65%-75% dipropyleneglycol phenyl ether, 8-10% monopropyleneglycol phenyl ether, 4%-6% tripropyleneglycol phenyl ether, and 1.55% alkalinity (reported as NaOH).

Example 1. Determination of the Coalescent Efficiency

The coalescent of the invention was added to a poly(VA/VV/AMPS) (94.4/5/0.6. wt.) aqueous polymeric dispersion at the indicated levels and the MFFT of the equilibrated mixtures was determined.

TABLE 1.1

Coalescence of a poly(vinyl acetate/butyl acrylate) (95/5, wt) aqueous polymeric dispersion

| Wt % Coalescent | MFFT(° C.) |
|---|---|
| 0 | 17 |
| 2 | 12 |
| 4 | 8 |
| 6 | 5 |

The coalescent of the present invention is an effective coalescent for the 94.4% vinyl acetate aqueous polymeric dispersion.

Example 2. Determination of the Coalescent Efficiency of the Coalescent of the Present Invention Relative to the Higher Cost Commercial Coalescent Agents Optifilm™ 400 and DPBA Coalescent at a 10 or 15 weight % level based on the weight of aqueous dispersion solids was added to a poly (vinyl acetate/butyl acrylate) (95/5, wt) aqueous polymeric dispersion. The mixture was stirred for 1 hr. at 25 C. The mixture was held at 25 C for 2 hrs before drawing down the samples on the MFFT bar and measuring the MFFT. Results are presented in Table 2.1 below.

TABLE 2.1

Coalescence of a poly(vinyl acetate/butyl acrylate) (95/5, wt) aqueous polymeric dispersion

| Coalescent | Wt % Coalescent | MFFT(° C.) |
|---|---|---|
| None | 0 | 40 |
| DPBA | 10 | 30 |

TABLE 2.1-continued

Coalescence of a poly(vinyl acetate/butyl acrylate) (95/5, wt) aqueous polymeric dispersion

| Coalescent | Wt % Coalescent | MFFT(° C.) |
|---|---|---|
| DPBA | 20 | 30 |
| OPTIFILM ™ | 10 | 32 |
| OPTIFILM ™ | 20 | 23 |
| Residue | 10 | 15 |
| Residue | 20 | 5 |

DPBA = dipropyleneglycol n-butyl adipate

The coalescent of the present invention exhibits greater efficiency in coalescing a 95% poly(vinyl acetate) aqueous polymeric dispersion relative to the other higher cost, low-VOC capable coalescents.

Example 3. Determination of the Coalescent Efficiency of the Residue Relative to the Higher Cost More Volatile Commercial Coalescent Agent TEXANOL™

The indicated coalescent was added to an aqueous polymeric dispersion at the indicated levels and the abrasive scrub resistance of the coating formed therefrom {coating was an above critical PVC formulation (63PVC, 30VS)} was determined according to the teachings of ASTM method D2486 after equilibration for 7 days at 77° F. and 50% RH as a proxy for effective film formation and resultant film toughness.

TABLE 3.1

Determination of residue coalescent efficacy relative to TEXANOL ™ coalescent.

| Polymeric dispersion composition (wt.) VA/BA/VV/AMPS/IA | TEXANOL ™ (wt. % on polymer solids) | Coalescent of the invention (wt. % on polymer solids) | Abrasive Scrub mean | Abrasive Scrub std. deviation |
|---|---|---|---|---|
| 78.5/16/5/0.3/0.2 | 7 | 0 | 226 | 44 |
| 94.4/0/5/0.6/0 | 7 | 4 | 150 | 24 |
| 94.4/0/5/0.6/0 | 11 | 0 | 141 | 19 |
| 94.4/0/5/0.6/0 | 0 | 11 | 112 | 20 |
| 78.5/16/5/0.3/0.2 | 0 | 7 | 226 | 44 |

The coalescent of the invention functions comparably to the higher cost TEXANOL ™ in a lower VOC formulation. TEXANOL ™ is 100% volatile by the ASTM test D2369 detailed hereinabove while coalescent of the invention is only 38.8% volatile.

Example 4. Determination of Hydrolytic Stability of Certain Polymeric Dispersions Coalesced with Various Coalescents A polymeric dispersion including as copolymerized units, 85% vinyl acetate, by weight based on polymer weight was loaded with 4%, 6%, 8% coalescent by weight based on polymer solids. The coalesced dispersion was neutralized to pH 8.35 with ammonia and subjected to heat aging in an oven at 50° C. and the pH recorded over a period of 14 days. The pH change was taken as a measure of the degree of hydrolysis of the polymer of the polymeric dispersion, lower pH corresponding to a higher degree of hydrolysis.

TABLE 4.1

Data regarding polymer hydrolysis

| Description | Initial pH | Adj. pH | 1 day HA | 4 day HA | 7 day HA | 14 day HA | 14 day R.T. |
|---|---|---|---|---|---|---|---|
| No coalescent | 4.56 | 8.35 | 7.64 | 6.89 | 6.68 | 6.57 | 7.61 |
| 4% Coal. of invention | 4.87 | 8.35 | 7.45 | 6.80 | 6.63 | 6.56 | 7.55 |
| 6% Coal. of invention | 5.05 | 8.52 | 7.91 | 7.13 | 6.90 | 6.77 | 7.95 |
| 8% Coal. of invention | 5.10 | 8.46 | 7.63 | 6.92 | 6.74 | 6.67 | 7.72 |
| 4% DPPH | 4.66 | 8.32 | 7.48 | 6.82 | 6.64 | 6.57 | 7.54 |
| 6% DPPH | 4.60 | 8.22 | 7.30 | 6.74 | 6.57 | 6.53 | 7.44 |
| 8% DPPH | 4.72 | 8.26 | 7.36 | 6.74 | 6.60 | 6.53 | 7.47 |

DPPH = Dipropyleneglycol phenyl ether

The coalescent of the invention in the method of the present invention at 6% and 8% loadings beneficially slows the hydrolysis of the vinyl acetate polymer relative to DPPH coalescent.

What is claimed is:

1. A coalescent consisting essentially of a residue from a process for forming a propyleneglycol phenyl ether, said residue consisting essentially of 65%-75% by weight, based on the weight of said residue, dipropyleneglycol phenyl ether, 8%-10% by weight, based on the weight of said residue, monopropyleneglycol phenyl ether, 4%-6% by weight, based on the weight of said residue, tripropyleneglycol phenyl ether, and 0.1%-10% by weight, based on the weight of said residue, alkalinity as NaOH.

2. A method for forming a coalesced aqueous polymeric dispersion comprising:
    a) providing a coalescent consisting essentially of a residue from a process for forming a propyleneglycol phenyl ether, said residue consisting essentially of 65%-75% by weight, based on the weight of said residue, dipropyleneglycol phenyl ether, 8%-10% by weight, based on the weight of said residue, monopropyleneglycol phenyl ether, 4%-6% by weight, based on the weight of said residue, tripropyleneglycol phenyl ether, and 0.1%-10% by weight, based on the weight of said residue, alkalinity as NaOH; and
    b) contacting an aqueous polymeric dispersion comprising, as copolymerized units, from 70% to 100%, by weight based on said aqueous polymeric dispersion solids weight, vinyl acetate monomer, with from 0.5% to 20% by weight, based on said aqueous polymeric dispersion solids weight, said coalescent.

3. The method of claim 2 wherein a second coalescent different from said coalescent is provided before, during or after step (b).

4. An aqueous coating composition comprising
    a) an aqueous polymeric dispersion comprising, as copolymerized units, from 70% to 100%, by weight based on said aqueous polymeric dispersion solids weight, vinyl acetate monomer; and
    b) from 0.5% to 20% by weight, based on said aqueous polymeric dispersion solids weight, of a coalescent consisting essentially of a residue from a process for forming a propyleneglycol phenyl ether, said residue consisting essentially of 65%-75% by weight, based on the weight of said residue, dipropyleneglycol phenyl ether, 8%-10% by weight, based on the weight of said residue, monopropyleneglycol phenyl ether, 4%-6% by weight, based on the weight of said residue, tripropyleneglycol phenyl ether, and 0.1%-10% by weight, based on the weight of said residue, alkalinity as NaOH.

5. The aqueous coating composition of claim 4 further comprising a second coalescent different from said coalescent.

6. The aqueous coating composition of claim 4 wherein said aqueous polymeric dispersion comprises, as copolymerized units, from 90% to 100%, by weight based on said aqueous polymeric dispersion solids weight, vinyl acetate monomer.

7. The aqueous coating composition of claim 4 further comprising at least one inorganic pigment.

8. The aqueous coating composition of claim 5 further comprising at least one inorganic pigment.

9. The aqueous coating composition of claim 6 further comprising at least one inorganic pigment.

* * * * *